United States Patent [19]

Garand et al.

[11] Patent Number: 5,699,099
[45] Date of Patent: Dec. 16, 1997

[54] ELECTRONIC PREPRESS SYSTEM INCLUDING THERMAL IMAGING APPARATUS WITH MULTIPLE COLOR SEPARATION MODES

[75] Inventors: Donald J. Garand, Chelmsford, Mass.; Dennis W. Dodge, Amherst, N.H.; Philip A. Rombult, Bradford, Mass.

[73] Assignee: Agfa Division, Bayer Corporation, Wilimington, Mass.

[21] Appl. No.: 496,714

[22] Filed: Jun. 29, 1995

[51] Int. Cl.$^6$ .................................... B41F 3/42
[52] U.S. Cl. ................ 347/172; 347/171; 347/115; 358/503; 358/515
[58] Field of Search ................ 358/296, 515, 358/500, 501, 503; 347/171, 172, 115

[56] References Cited

U.S. PATENT DOCUMENTS

| | | |
|---|---|---|
| 5,341,159 | 8/1994 | Kerr .................................. 346/134 |
| 5,436,695 | 7/1995 | Lucking et al. ...................... 347/264 |
| 5,578,824 | 11/1996 | Koguchi et al. ..................... 250/318 |

*Primary Examiner*—Peter S. Wong
*Assistant Examiner*—Derek J. Jardieu
*Attorney, Agent, or Firm*—Julie A. Krolikowski

[57] ABSTRACT

An electronic prepress system for electronically preparing and outputting images onto image receiving materials includes a computer for generating and storing color separated images in electronic files. A processor processes the electronic files received from the computer and converts the electronic files to rasterized image files. The rasterized image files are accepted by the scan engine from the processor. The scan engine outputs color separated images on an image receiving material and is operable in a first operating mode for outputting the color separated images individually onto a first image receiving material as a set having a separated image for each of the color separated images, and a second operating mode for outputting the color separated images onto a second image receiving material having the color separated images superimposed as an assembled color proof of the image.

8 Claims, 8 Drawing Sheets

ELECTRONIC PREPRESS SYSTEM INCLUDING THERMAL IMAGING APPARATUS WITH MULTIPLE COLOR SEPARATION MODES

BACKGROUND OF THE INVENTION

The present invention relates to imaging output devices, and more particularly to an apparatus (and method) for outputting halftone-dot images automatically from rasterized digital image data, by an image transfer process between a donor material and a receiver material, in an internal drum imaging device. The invention has applications in both imagesetting and direct digital color proofing, hereinafter DDCP, and platemaking.

In image transfer processes such as thermal melt transfer, dye sublimation-type thermal transfer, dye fusion-type thermal transfer, and ablution transfer, a donor material is superimposed onto a receiver material so that imagewise exposure of the donor material by a radiant energy or heat, such as a laser beam, causes transfer of the donor material onto the receiver material upon receipt of a sufficient amount of energy. An example of such transfer materials and applications for preparing and using them are disclosed U.S. Pat. Nos. 5,232,817 and 5,238,778. For DDCP applications the imagewise exposure usually occurs in a series of color separations of such as cyan, yellow, magenta, and black (CYMK). For each color separation, a correspondingly colored donor sheet is superimposed onto the receiver, exposed to transfer the respective color separation of the image onto the receiver material, and then removed. The image is thereby transferred onto the receiver material and a color proof is obtained.

Heretofore, DDCP devices have been flatbed and external drum type proofing devices, in which the receiver and donor materials are superimposed on a flat bed or a rotary drum support. Prior external drum devices are disclosed in U.S. Pat. Nos. 5,164,742 and 5,341,159. The methods and mechanisms for handling the receiver and donor materials differ for each type of support to fulfill such requirements as applying the materials onto the support, ensuring full, intimate contact between the receiver and donor sheet, peeling the donor from the receiver, and transporting the completed proof without damaging the image. A common factor among DDCP devices is that the color donor sheets must be sequentially superimposed onto a single receiver sheet and then removed without disturbing the receiver sheet on the support to ensure registration of the transferred partial images that create the final proof. While the prior art devices have capably serviced the graphic arts and printing industries, inherent advantages are realized in a thermal imaging device which relies on an internal drum type material support, as will become apparent in the following description of the invention, for applications in proofing, imagesetting and platemaking.

It is therefore a general object of the invention to perform image transfer processes such as dye sublimation-type thermal transfer, dye fusion-type thermal transfer, and ablation transfer, as well as conventional imagesetting and dry processes, using the respective required materials, to output films, color proofs, and/or printing plates in a single imaging device.

It is a general object of the present invention to generate high quality digital proofs in an automated internal drum proofing device.

It is a general object of the invention to provide an internal drum support surface for adhering a receiver sheet upon and sequentially superimposing a series of color donor material for transfer of respective color separations of an image to create a color proof on the receiver material while registered to the drum surface.

It is an object of the invention to achieve intimate contact between a donor material and a receiver material used in a thermal imaging process, particularly on an internal drum material support.

It is further an object of the invention to provide an apparatus specifically for transporting the donor and receiver materials without damaging the sensitive sides thereof.

SUMMARY OF THE INVENTION

The invention comprises an electronic prepress system for electronically preparing and outputting images onto image receiving materials. The system comprises a computer for generating and storing color separated images in electronic files, a processor for processing the electronic files received from the computer and converting the electronic files to rasterized image files, and an output device for accepting the rasterized image files from the processor and outputting the color separated images on an image receiving material. The output device has a first operating mode for outputting the color separated images individually onto a first image receiving material with separate images for each of the color separated images. A second operating mode is for outputting the color separated images onto a second image receiving material with the color separated images superimposed as an assembled color proof.

The output device includes a cylindrical drum support for supporting the image receiving material. The image receiving material is supported against an inner circumferential surface of the drum. The output device further includes an imaging unit for exposing the images onto the image receiving material according to a signal from the processor and a material loading mechanism for automatically loading and unloading the material onto the cylindrical drum.

BRIEF DESCRIPTION OF THE DRAWINGS

The features and objects of the invention will become apparent in the following detailed description of the illustrative preferred embodiments of the invention with reference to the accompanying drawings, in which.

DETAILED DESCRIPTION OF THE INVENTION

Figure 1:
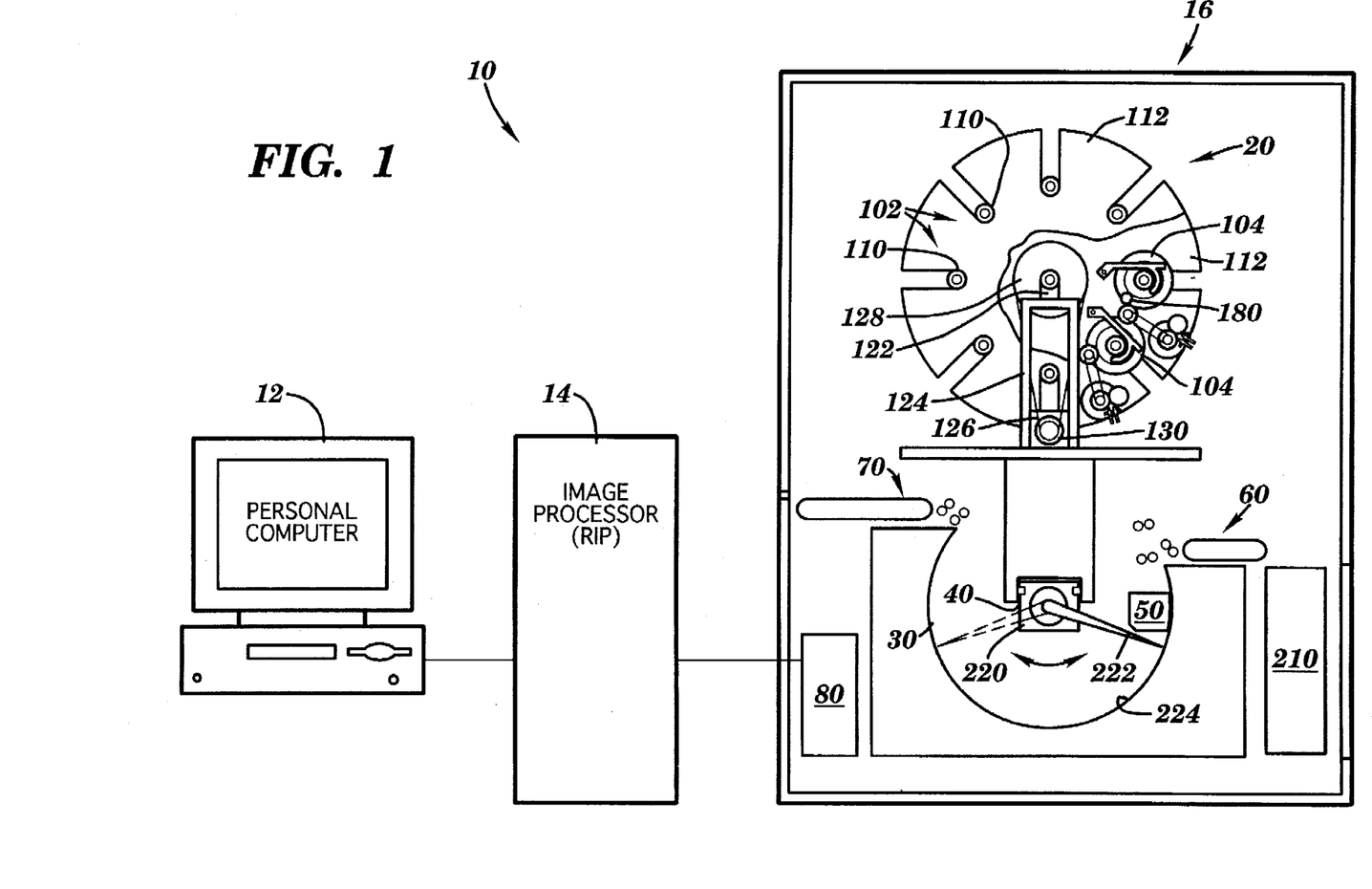
FIG. 1 is a schematic view of an electronic prepress system according to the present invention including an internal drum thermal imaging device.

In a preferred embodiment of the invention, an electronic prepress system generally referred to as 10 is shown in FIG.

1, comprising a personal computer workstation 12 at the front end of the system 10 for generating and/or storing electronic files of graphic images and text, a rasterized image processor 14 for digitizing the electronic files, and a DDCP apparatus indicated generally as 16 at the output end of the system 10. The DDCP apparatus comprises a material supply carousel 20, an internal drum material support 30, an imaging unit 40, a material applicator 50, a donor exit conveyor 60, an output conveyor 70, and a control unit 80. The overall operation of the DDCP apparatus 10 comprises first dispensing a portion of receiver material from the material supply carousel 20 into the internal drum material support 30 by means of the material applicator 50, cutting the receiver material at the desired length, and securing the receiver material to the drum 30. Then a portion of donor material is dispensed from the material supply carousel 20, is applied onto the internal drum material support 30 and laid on the receiver material in a superimposed relationship, cut from the material supply carousel 20, and secured thereto. The imaging unit 40 exposes an image separation particular to the donor color to be exposed, typically referred to as a color separation, transferring the exposed image to the receiver material. Afterwards the donor material is removed from the receiver material by means of the material applicator 50 and is guided to the donor exit conveyor 60. The receiver material remains secured to the internal drum material support 30. The color donor materials are then consecutively applied onto the internal drum material support 30 by the material applicator 50, exposed, and removed for each color separation required to complete the DDCP process. Following completion of the image, the receiver is removed from the internal drum material support 30 by the material applicator 50 and transported to the output conveyor 60. A detailed description of the DDCP apparatus 10 and operation thereof is provided hereinafter.

Figure 2:
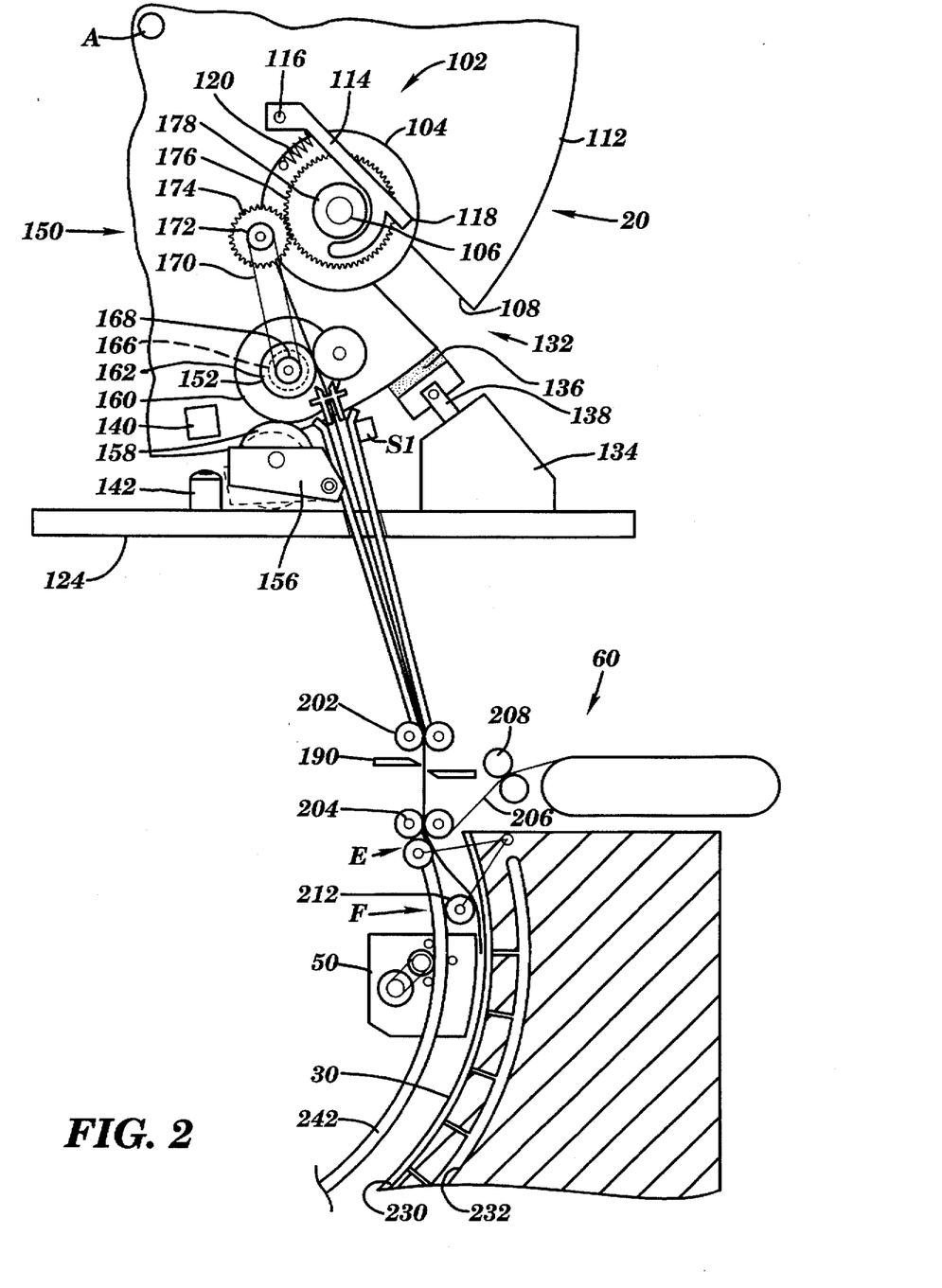
FIG. 2 is an enlarged schematic view of a portion of a material supply carousel featuring a material feed and rewind mechanism according to the present invention.

The material supply carousel 20 is positioned above the drum 30 and imaging unit 40 as shown in FIG. 1. The carousel 20 has eight material supply stations 102 for supporting different supply rolls 104 of imaging materials, such as a roll of receiver material, six rolls of color donor material, and another type of imaging material for receiving an image. The number of material supply stations 102 may be greater or smaller, as needed. Referring also to FIG. 2, each supply roll 104 is supported on two removable end spindles 106 which are inserted into the ends of a rigid core on which the supply roll 104 is wound. The end spindles 106 supporting the supply roll are mounted into a slot 108 in a respective media supply station 102 against bearings 110 provided in the carousel side plates 112. The spindles 106 are secured into the slot 108 by a clamp 114 mounted on pivot pin 116 adjacent to each bearing 110. The clamp 114 is spring loaded toward the clamped positioned to prevent unclamping during carousel rotation. The clamp 114 is provided with a handle 118 to facilitate an operator to pivot the clamp against the force of spring 120 and release the end spindles 106 from the slot 108 in the carousel side plates 112.

The carousel 20 is supported for rotation about a center axis A by bearing blocks 122 attached to a carousel support frame 124. A belt 126 and pulley 128 are driven by a servo motor 130 to rotate the carousel 20 and a selected material supply station to a dispensing position 132. A brake mechanism 134 is provided on the support frame 124 for locking the carousel when the selected material supply station has been rotated to the dispensing position 132. The brake mechanism 134 has a rubber stop 136 abutted against the edge of the carousel side plate 112 to prevent rotation of the carousel 20 during dispensing of the material. During rotation of the carousel, the rubber stop 136 is retracted from the edge of the side plate 112 allowing the carousel 20 to be driven freely. A brake motor (not shown) actuates a linkage mechanism 138 to extend and retract the rubber stop 136. A sensor patch 140 is used to identify each material supply station 102 and a sensor eye 142 recognizes the selected material supply station and signals the servo motor 130 to stop rotation of the carousel 20 with the selected station at the dispensing position 132. The brake is activated and the linkage mechanism 138 extends the rubber stop 136.

Each material supply station 102 is provided with a material feed and rewind mechanism, generally indicated by reference numeral 150 which allows the material to be drawn from and rewound onto the supply roll 104 in a controlled manner, to be described hereinafter with reference to a single material supply station 102 shown in FIG. 2. A pair of rollers 152 is supported for rotation by the carousel side plates 112 at the periphery of the carousel 20. The material remains nipped between the roller pair 152 so that the leading edge is positioned for feeding into the drum 30. Pressure between the rollers 152 is adjustable by a tensioning mechanism (not shown) which changes the distance between the roller pair. The tensioning mechanism can be adjusted by during assembly to adjust material steering during feeding of the material through the rollers 152.

The roller pair 152 is driven by a retractable friction drive mechanism 156 mounted to the support frame 124. The friction drive mechanism 156 is used to drive each material feed and rewind mechanism 150. During material dispensing and rewinding, the friction drive 156 engages the material feed mechanism 150 at the dispensing position 132. The friction drive 156 has a motor (not shown) coupled to a friction gear 158 which engages a friction wheel 160 on a drive roller 162 to rotate the roller pair 152 during material dispensing. The rotation of the roller pair 152 pulls the media from the supply roll 104 to feed the material into the system. The friction wheel 160 is fitted with a one-way over-running clutch 166 to allow the rollers 152 to over-run the rotation by the friction wheel 160 when the roller pair 152 is driven in the dispensing direction, and the material can be pulled from the supply roll 104 at a rate faster than the roller pair 152 is driven. To assist in rotation of the supply roll 104, a drive pulley 168 fixed to the drive roller drives a belt 170, a driven pulley 172, and a spur gear 174. The spur gear 174 is engaged with a roll drive gear 176 on the supply roll end spindle 106 to rotate the supply roll 104. The roll drive gear 176 is fitted with a friction clutch 178 which allows the supply roll end spindle 106 to over-run the roll drive gear 176 and prevents uncontrolled unwinding of the material from the supply roll 104 that can occur due to the rotational inertia of the supply roll. Once the material is fed into the system it is cut by a cutting mechanism 190 beyond the roller pair 152, leaving surplus material in the system and inhibiting rotation of the carousel 20. Therefore, the surplus material is rewound onto the supply roll 104 before the carousel is rotated to another material supply station. To rewind the supply roll the friction drive mechanism 156 rotates the friction gear 158 in reverse drive. The friction gear 158 drives the drive pulley 168, the belt 170, the driven pulley 172, the spur gear 174, and the roll drive gear 176 in the rewind direction, while the roller pair 152 rotates freely due to the one-way clutch 166 on the friction wheel 158. A dampening disk (not shown) can be mounted on the rollers 152 to control rotation of the rollers 152 caused by the material passing therethrough during rewinding. The surplus material is rewound onto the supply roll 104 until the leading edge is held between the roller pair 152 as determined by a sensor S1 positioned at the periphery of the carousel. Then the material feed and rewind mechanism 150 is reset and ready for carousel rotation. The friction drive mechanism 156 is retracted from the material feed and rewind mechanism 150 in order to rotate the supply carousel 20.

The supply rolls are selectively wound and loaded into the material supply stations depending on the material. For example, the receiver material is loaded into the drum with the receiving side facing upward. The color donor materials are fed into the drum with the sensitive "donating" side facing down toward the drum surface. For both receiver and donor materials the direction of the curl of the material matches the concavity of the drum to assist in adhering the receiver to the drum and achieving intimate contact between the donor and receiver material. Therefore, in the receiver material supply station the feeding and rewinding mechanism has an idler gear 180 (FIG. 1) interposed between the spur gear and the roll drive gear to account for the receiver supply roll being mounted into the material supply station in an opposite sense from the donor supply rolls.

Below the dispensing position 132 of the carousel a cutter 190 and several pairs of motor driven transport rollers 202, 204 are positioned on the input side of the internal drum 30. Also located on the input side of the drum is a donor exit conveyor 60 including a fixed platen 206 which guides material from the drum into a roller pair 208 driven by a motor to transport used donor sheets to a collection bin 210. Additionally, a pivoting idler roller 212 is mounted at the input side of the drum to assist with guiding the material during loading into the drum. Further details regarding these element will be described hereinafter.

The imaging unit 40 has a carriage 220 which travels parallel to the axis of the drum 30, to provide relative movement between the carriage 220 and the internal drum material support 30. An exposure beam source generates an exposure beam 222 which is directed through an optical system to the drum surface 224. The beam 222 is scanned across the drum surface 224, generally indicated by an arrow, while the exposure beam 222 is modulated according to the digital image data supplied imaging unit 40 from a rasterized image processor (not shown). The motion of the carriage 220 along the axis is synchronized with the beam scanning to line-wise scan the modulated beam, producing the output image on the drum surface 224.

The internal drum material support 30 has a semicylindrical configuration with a support surface spanning around the axis of the drum. The drum is cast aluminum to provide stability for the imaging unit 40 and the carousel support frame 124, and to eliminate vibrations generated by the material supply carousel 20 and material applicator 50, preventing disturbances in the system during imaging. As can be viewed in FIG. 2, the drum surface is provided with vacuum channels 230 through which the vacuum is pulled to secure the material in registration in the drum during material superimposition, imaging, and donor removal. The vacuum is pulled through vacuum chambers 232 in the drum by a vacuum pump and by porting blocks located at each edge of the drum surface along the material path (not shown).

Figure 3:
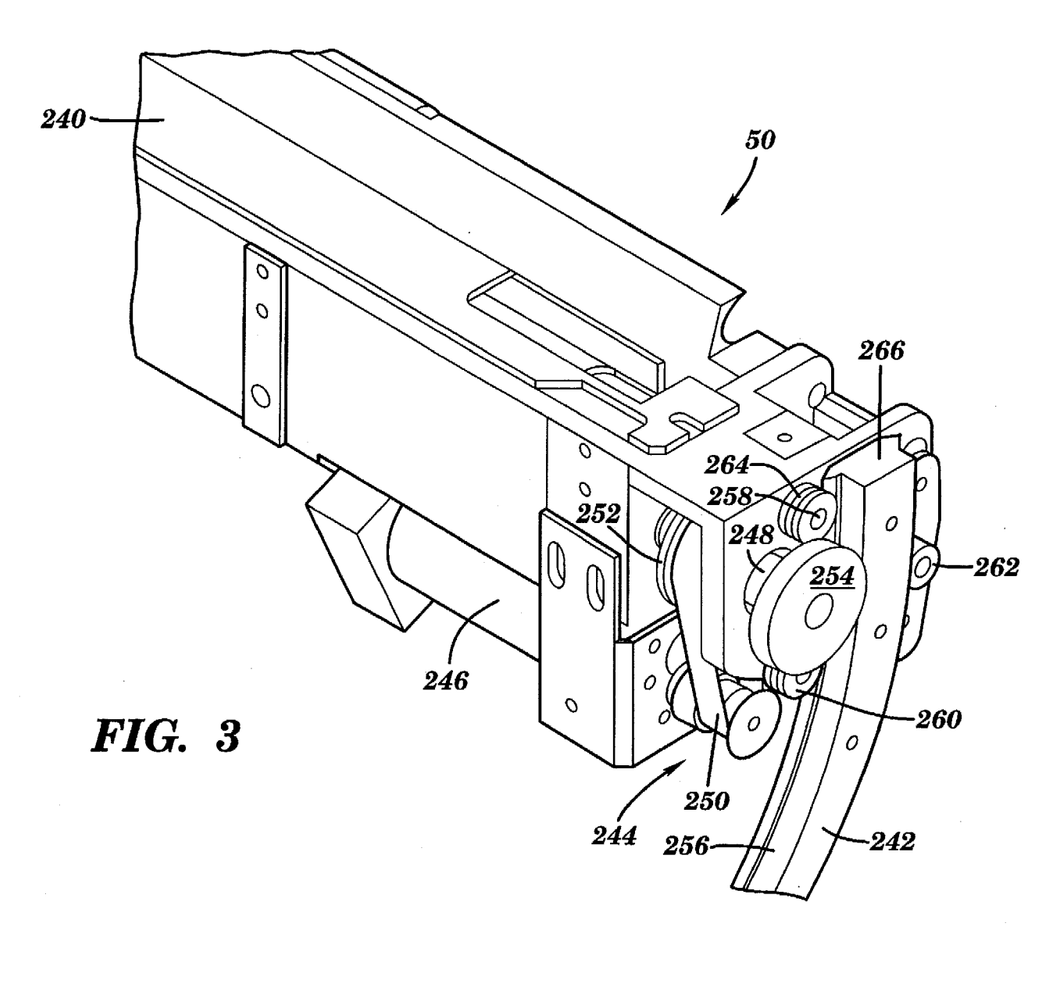
FIG. 3 is a perspective view of a drive system for a self-propelling material applicator according to the present invention.

The self-propelled material applicator 50 is shown in FIG. 3. The applicator carriage 240 is mounted at each end (one end shown) on a track 242 which follows the circumference of the drum 30, as can be viewed in FIG. 2. The tracks 242 are accurately referenced and fixed to provide precision movement of the applicator carriage 240 along the material supporting surface of the drum. The applicator carriage 240 has a self-propelling drive system generally indicated as 244, which moves the applicator carriage along the tracks with precision movement. An applicator drive motor 246 is supported on the carriage 240. The motor 246 drives a longitudinal shaft 248 which is connected to the motor 246 through a belt 250 and pulley 252. The drive shaft 248 has a drive gear 254 at each end thereof engaged with an internal-type gear 256 fixed to each track 242. The drive gears 254 on the applicator minimize unevenness of the drive motion from one side of the applicator 50 to the other and also minimizes backlash. The applicator carriage 240 is supported on the track by three bearings 258, 260, 262 mounted on each side of the applicator. The bearings have V-grooved outer races 264 which cooperate with a bearing rail 266 adjacent to the internal-type gear 256 to accurately maintain the axial and radial position of the carriage with respect to the drum. Two bearings 258, 260 are located on the inner side of the rail 266 and one bearing 262 is located on the outer side to provide balance and stability to the applicator for precision movement of the applicator carriage 240.

Figure 4:
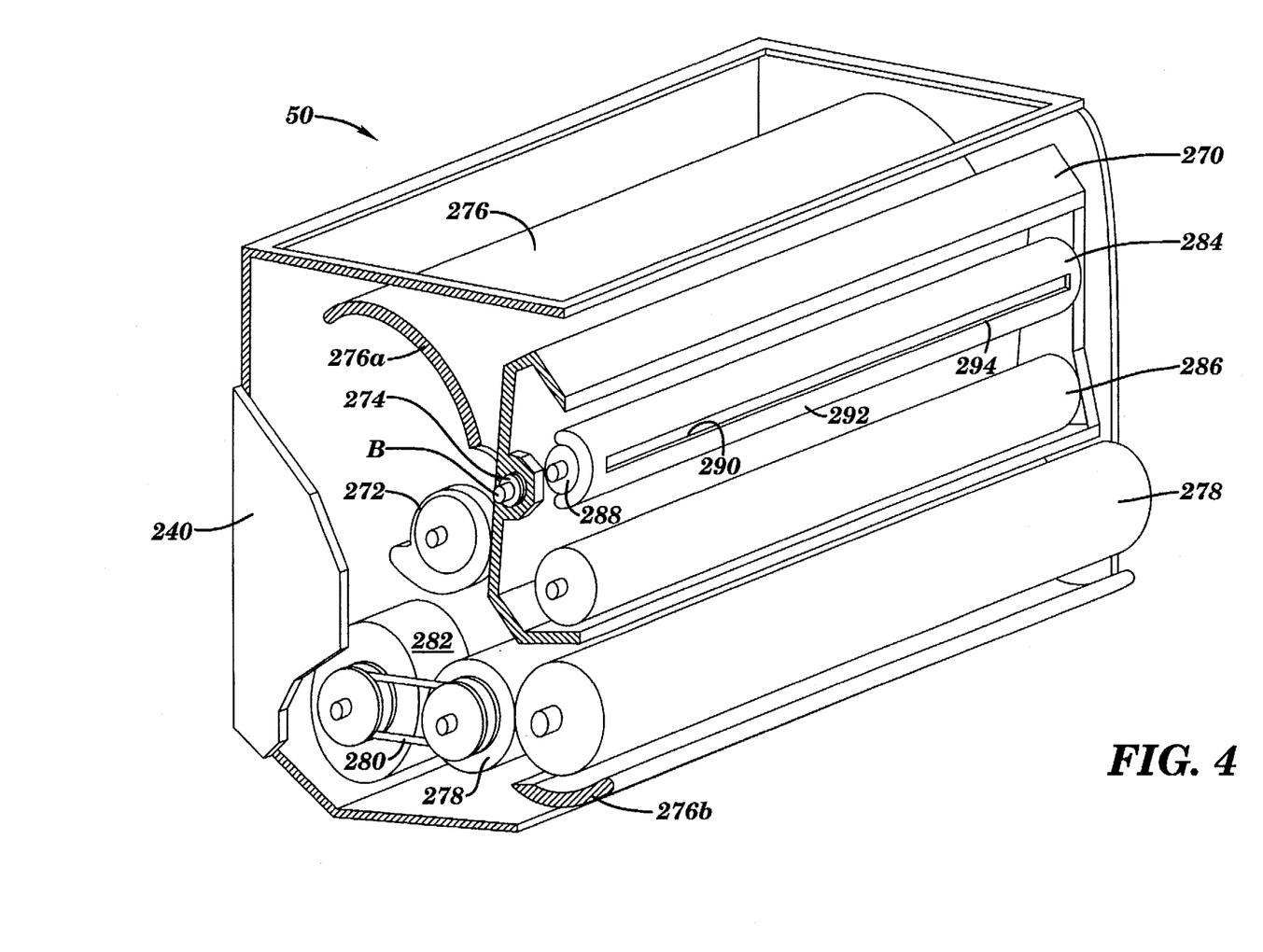
FIG. 4 is a perspective cutaway view of the material applicator featuring an attachment member and an ironing roller according to the present invention.

Referring to FIG. 4, the applicator 50 has a pivotable platen 270 which guides incoming material through the applicator in two different paths, depending on if the material is a receiver or donor material. The pivotable platen 270 is mounted to the applicator carriage 240 by end pins at point B, and is actuated by a rotating cam 272 in contact with the pivotable platen 270. The pivotable platen 270 is urged into contact with the cam 272 by a torsion spring 274 mounted about the pivot pin at point A. The pivotable platen 270 moves between two positions. In a first position the material is fed between the pivotable platen 270 and the drum, generally under the applicator. In a second position the material is fed through the applicator, between the pivotable platen 270 and a curling platen 276 which has a fixed portion 276a and a curling portion 276b which guide the material through nipped applicator rollers 278 and against the drum. The curling portion 276b is hinged to the fixed portion 276a and is movable relative to the fixed portion by means of an actuator (not shown) to assist with wrapping the donor material around the applicator roller and curling the donor without jamming in the curling portion 276b of the platen. The curling platen 276 mates with the applicator rollers 278 which are segmented along the axis of rotation to insure movement of leading edge of the donor material through the nip of the applicator rollers 278, as the leading edge tends to curl. The applicator rollers 278 are driven by the motor 280 and belt connection 282. The pivoting platen 270 also supports an attachment member 284 and an ironing roller 286 for movement with the platen 270 to selectively position either the attachment member 284 or the ironing roller 286 in closer proximity to the drum. The attachment member 284 has a vacuum pick-up tube 288 for attaching the material fed into the drum to the applicator. Vacuum is supplied to the tube 288 which has a longitudinal slot 290 along its length. The tube 288 is covered with a foam cushion 292 having a longitudinal slot 294 aligned with the tube slot 290 to apply the vacuum at the side of the cushion facing the drum. The pivoting platen 270 is pivoted against a leading edge of material being attached to the applicator. Compression of the foam cushion 292 against the material occurs as the material is pressed against the surface of the drum during attachment to the applicator. The compression of the foam cushion 292 against the drum creates an effective seal at the interface between the cushion and the material, even when the tube slot 290 is misaligned. Further details of the pivotable platen will be described hereinafter with reference to the sequence of operation of the material applicator in the internal drum proofer.

Figure 5:
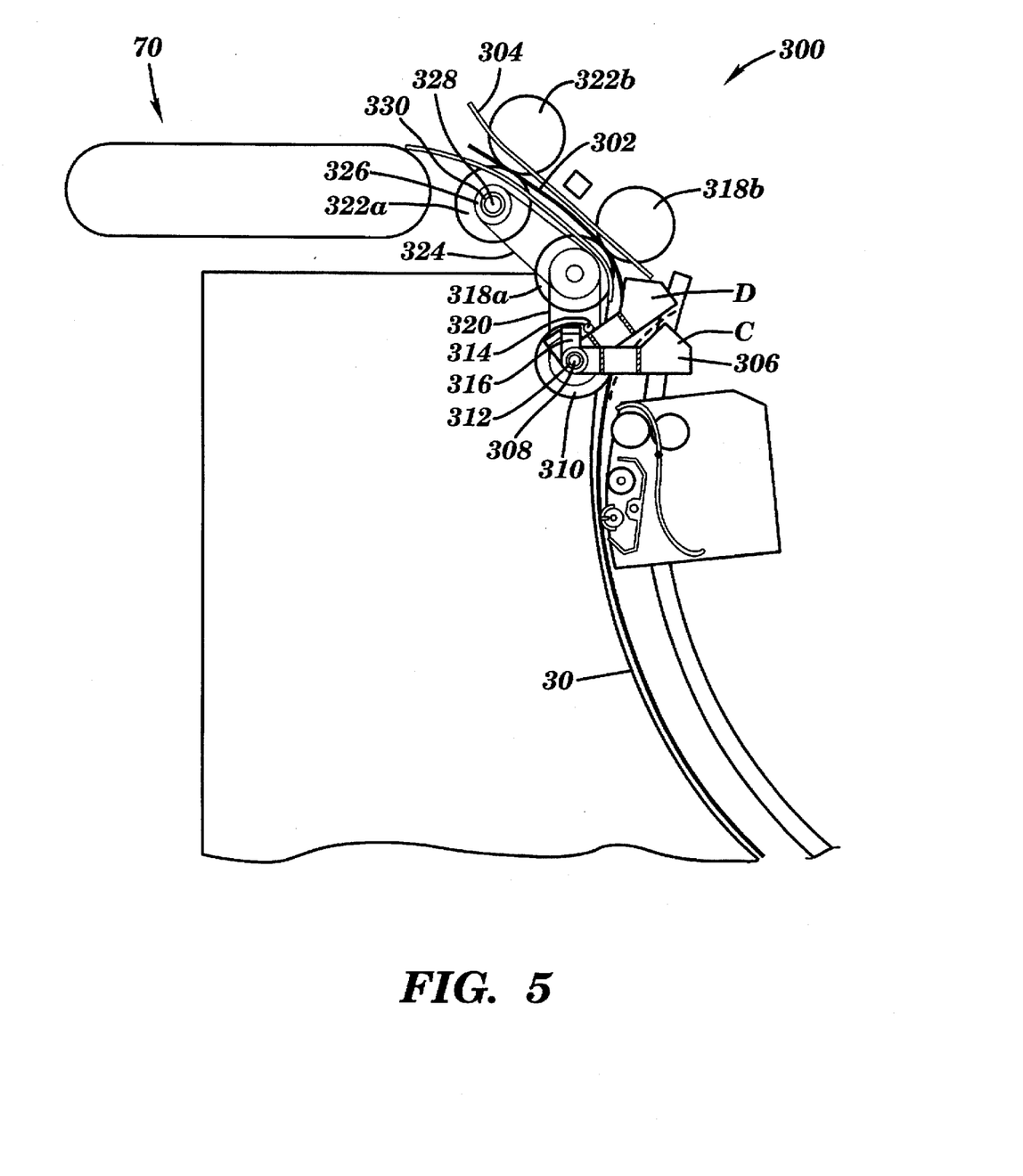
FIG. 5 is an enlarged schematic view of an output conveyor according to the present invention.

Referring to FIG. 5, the output conveyor 70 is shown located on the output side of the drum 30 featuring an output guide referred to generally as 300, for removing the receiver sheet 302 from the drum. The output guide 300 has a pivoting arm 306 for directing the material exiting the drum 30 to curve against the natural curl of the material, which is in the same orientation as the curvature of the drum 30. The output guide 300 also protects the sensitive side of the receiver material from contact with the platen 304 during transport of the material to the output conveyor 70. The pivot arm 306 is mounted to a shaft 308 of an idler roller 310 located at the edge of the drum. The material is guided through the pivot arm 306 and then pivoted up into the guide 300. The pivot arm 306 is mounted through a slip clutch 312 so that upon counter-clockwise rotation of the shaft 308 as viewed in FIG. 5, the pivot arm 306 pivots upward from an initial position C toward a guiding position D until it is stopped against a pin 314, while the shaft 308 continues to rotate. The pivot arm 306 is counterbalanced by a weighted leg 316 about the shaft 308 to maintain the pivot arm 306 in the guiding position D. Above the output guide is a driven roller pair 318a,b with the driven roller 318a directly coupled to a servo motor (not shown). The driven roller is connected to the lower idler roller 310 in a 1:1 ratio through a belt and a pulley drive 320. An accelerated idler roller pair 322a,b is also driven by the driven roller 318a through another belt and a pulley drive 324 with a ratio of 0.95:1. The smaller pulley 326 located on the accelerated idler roller 322a imparts an increased speed to the accelerated rollers 322a,b relative to the driven roller pair 318a,b. The smaller pulley 326 is fitted to the accelerated roller shaft 328 through a slip clutch 330. Because the accelerated rollers rotate faster than the driven rollers, the material is pulled taut between the accelerated rollers and the driven rollers, and the receiving side of the moving material does not make contact along the guide platens. The belt over-runs about the accelerated roller pulley to drive the material at the same rate of the driven rollers and lower idler roller feed the material to the output conveyor. Rotating the shaft 308 in reverse through the belt and pulley drive 320 resets the pivot arm 306 to the initial position to collect the next receiver for redirecting into the output conveyor.

Figure 6A:
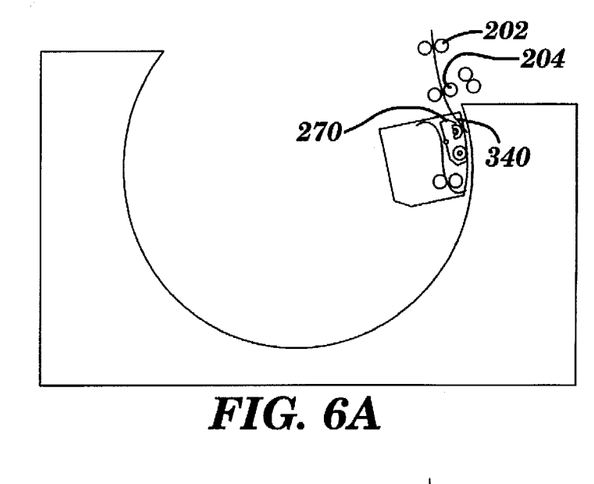
FIGS. 6A–6L are sequential illustrative views of the operation of the material applicator in the internal drum according to the present invention.
Figure 6B:
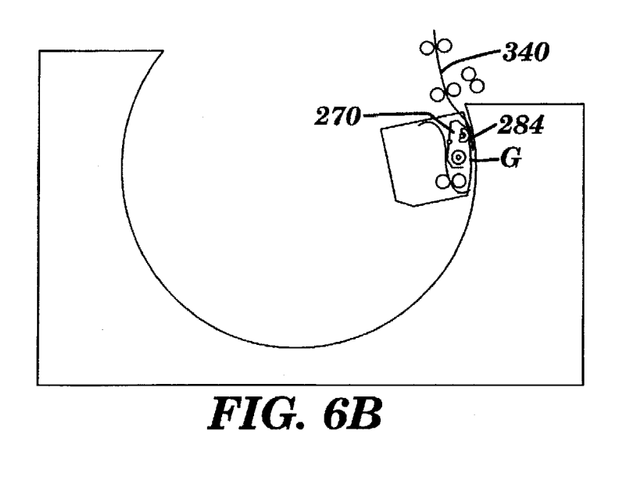
Figure 6C:
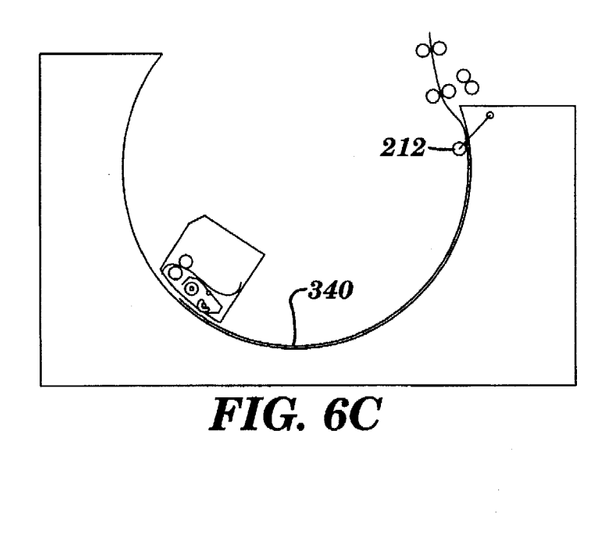
Figure 6D:
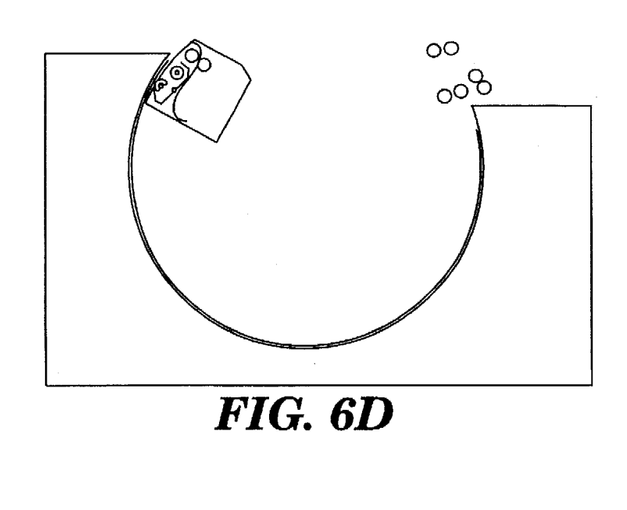

The sequence of operation will now be described with reference to FIGS. 2 and 6A–6L. The material supply carousel 20 is rotated to position the receiver material supply station 102 is at the dispensing position. The material feed mechanism 150 is driven by the friction drive 156 as previously described, to advance the leading edge of the receiver material 340 from the roller pair 152 through the driven transport rollers 202, 204, past the cutter 190 and into the material applicator 50 which is initially located on the input side of the drum 30 as in FIG. 6A. The pivoting idler roller 212 (FIG. 2) is initially at position E to allow the leading edge of the receiver material to pass between the roller 212 and the drum surface. The pivotable platen 270 is in a neutral position as the leading edge of the receiver 340 is guided against the drum surface 30 by the pivoting idler roller which pivots to position F. The receiver is loaded until the leading edge is under the pivoting platen 270 at point E as in FIG. 6B and halted. The pivoting platen 270 is then pivoted toward the receiver material 340 to make contact with cushion 284 when the vacuum is applied to attach the receiver material to the cushion, and then the platen 270 is pivoted back to the neutral position. The applicator 50 is then driven along the track 242 on the circumference of the drum 30 and the transport rollers 202, 204 are driven to assist in advancing the material from the material supply station.

The transport rollers 202 are driven in synchronization with the movement of the applicator to move the receiver material into the drum in a controlled manner. The receiver material is allowed to make contact with the drum against the backside of the receiver material during loading. However, it is desirable to avoid pulling the receiver material taut between the attachment member and the idler roller as the leading edge could detach from the applicator. The control unit for the DDCP apparatus controls the motor driving the transport rollers and the applicator drive motor such that the receiver material is led into the drum at the rate which the applicator drive motor transports the applicator carriage along the track. Further, the transport rollers are controlled according to the configuration of the drum and the amount of material being loaded to advance the receiver with a sufficient amount of slack to allow the motion of the pivoting idler roller against the receiver material, so as not to pull the receiver taut, however not to advance surplus slack as bubbles, buckling and steering can occur. Moreover, the transport rollers measure the dispensing of the material and the applicator drive is stopped according to the size of the job to be imaged, to cut the material from the supply roll. Then the applicator resumes movement along the tracks 242 and pulls the receiver sheet 340 to an imaging position in the drum 30, the vacuum on the attachment member is turned off and the vacuum channels 230 in the drum are turned on to hold the receiver material in register in the drum as in FIG. 6D. The media rewind mechanism 150 then rewinds the surplus receiver material back to the material supply station on the carousel. As the applicator 50 returns to the input side, the pivoting platen 270 is pivoted to the ironing position so the ironing roller is in rolling contact with the material to remove air pockets from between the drum 30 and the receiver 340.

Figure 6E:
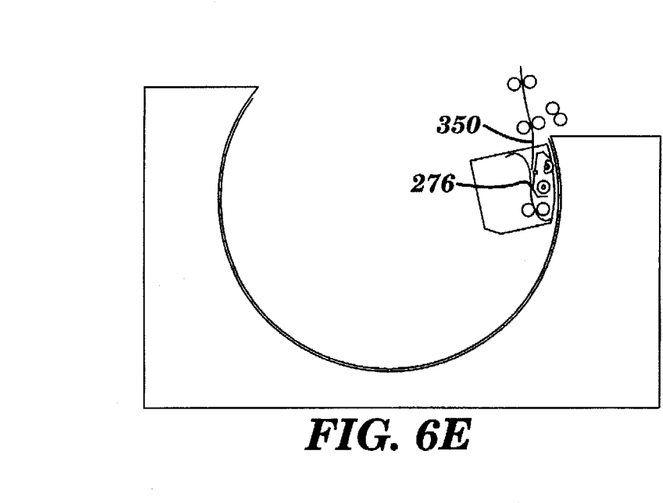

Next the carousel 20 is rotated to position a selected donor material in the dispensing position. In FIG. 6E, the leading edge of the donor material 350 is advanced to the applicator with the pivotable platen in the neutral position. The donor material is guided into the curling platen 276 and through the applicator rollers 278, positioning the sensitive side of the donor material 350 facing the receiver 340 as in FIG. 6F. The pivotable platen is pivoted into the ironing position to urge the leading edge of the donor against the drum to be pulled down by the vacuum so as to overlap the leading edge of the receiver sheet.

During superimposition of the donor material 350 onto the receiver 340, it is desirable to prohibit relative motion between the receiver and donor as smudging of the receiver can occur, and to minimize the forces imparted to the donor material at the transport rollers and the applicator. It is beneficial to prevent the receiver from being pulled taut between the transport rollers and the applicator roller pair as the sensitive side could drag against the imaging unit or other hardware and scrape the donor material. Further it is beneficial to prevent excessive slack in the drum which can cause hard to correct bubbles during superimposition and smudging on the receiver sheet. To accomplish this, the dispensing of donor material is metered by the transport rollers as for the receiver material as described above. As the donor is advanced into the drum by the transport rollers, the applicator travels along the tracks to the output side of the drum as in FIG. 6G. However, for the donor loading, the control unit for the DDCP apparatus controls and coordinates the motors driving the transport rollers, the applicator drive, and the applicator rollers simultaneously, to suspend the donor material over the drum in a catenary 354 as it is continuously advanced into the drum, hanging freely in a cur„ed manner between the applicator and the transport rollers. The ironing roller 286 presses against the superimposed materials and rolls against the drum while the applicator traverses the drum to remove air pockets from between the receiver and donor material and provide full contact between them for ideal image transfer from the donor material onto the receiver material.

Figure 6F:
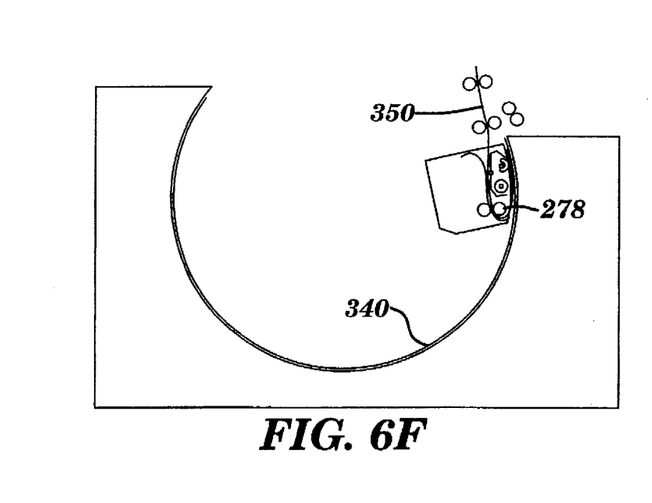
Figure 6G:
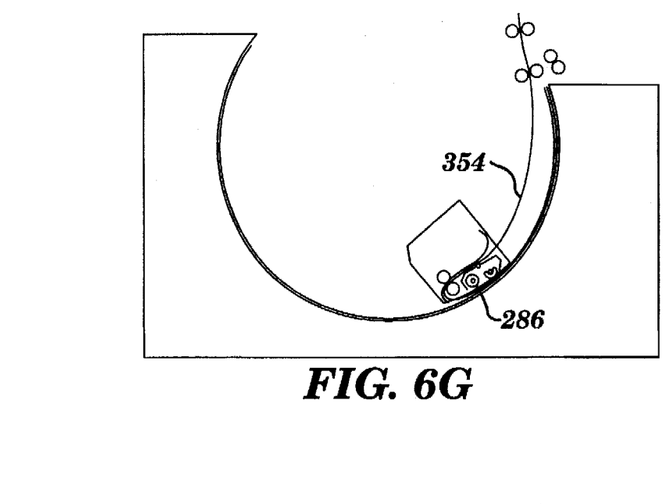
Figure 6H:
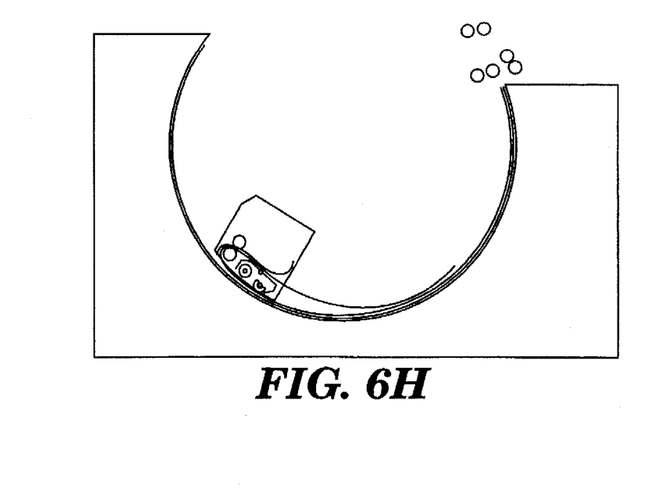
Figure 6I:
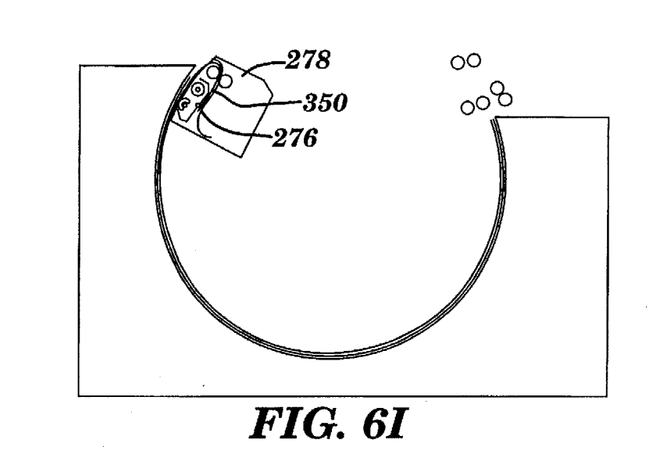
Figure 6J:
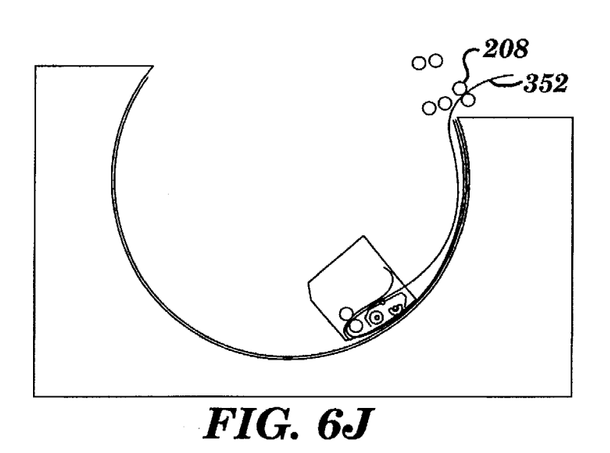

The transport rollers measure the dispensing of the donor and the applicator drive is stopped when approximately half of the donor has been applied onto the receiver, at which time the cutter cuts the donor material from the supply roll. In FIG. 6H, the applicator applies the remaining half of the donor material onto the receiver sheet which overlaps the edges of the receiver sheet all around so that the vacuum being pulled through the vacuum channels in the drum pulls down the donor onto the receiver while the ironing roller removes the air pockets. After the donor sheet has been applied to fully cover the receiver sheet as in FIG. 6I, the trailing end of the donor sheet 350 remains nipped in between the applicator rollers 278 and curled around the curling platen 276 while the applicator remains on the output side of the drum.

Next the color separation corresponding to the donor color in superimposition with the receiver sheet is exposed by the imaging unit. The imaging unit scans the digital image data onto the donor, transferring color from the donor sheet to the receiver sheet in the exposed areas. The donor sheet is then removed from the receiver in a peeling process performed by the applicator as in FIG. 6J. The applicator is driven along the tracks 242 back toward the input side of the drum as the applicator rollers are driven in reverse to peel back the donor sheet. The ironing roller assists in the peeling process of the donor material by restricting the donor still in contact with the receiver from shifting, which can cause distortions of the transferred image on the receiver material. The tail end 352 of the donor is passed back over the drum surface and advanced toward the input side of the drum where the donor exit conveyor 60 is located. The tail end of the donor is guided by the fixed platen 206 into the roller pair 208 which transport the donor into a collection bin, as the applicator completes the removal of the donor sheet.

As the donor material is removed from the drum by the donor exit conveyor 60, the material supply carousel 20 is rotated to position the next donor material to be superimposed onto the receiver material at the dispensing position. The process for applying the donor material, exposing the color separation corresponding to the current donor color with the imaging unit, and removing the exposed donor, is repeated for the color separations as necessary. Then the receiver material having a complete color proof of the transferred digital image, is carefully removed from the drum by the applicator, through the output guide and to the output conveyor.

Figure 6K:
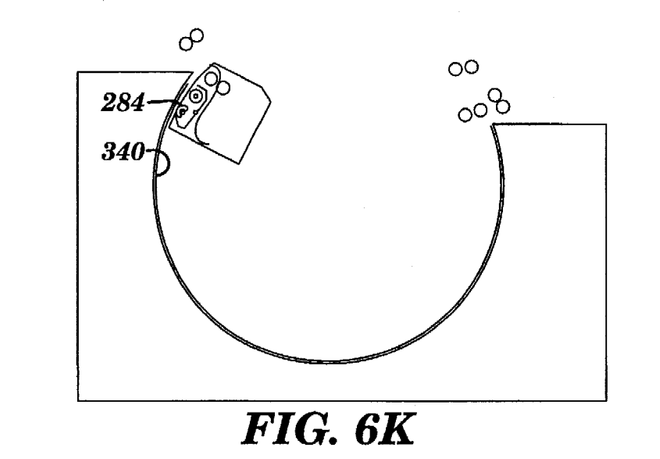

To remove the receiver from the drum, the applicator is driven toward the output side of the drum and positioned near the leading edge of the receiver 340 as in FIG. 6K. The pivotable platen is actuated to attach the leading edge by the vacuum on the foam cushion of the attachment member 284. The vacuum is supplied to the tube, while the vacuum on the drum is turned off to release the receiver sheet from being held against the drum. The pivotable platen returns to a neutral position during for transport of the receiver material.

Figure 6L:
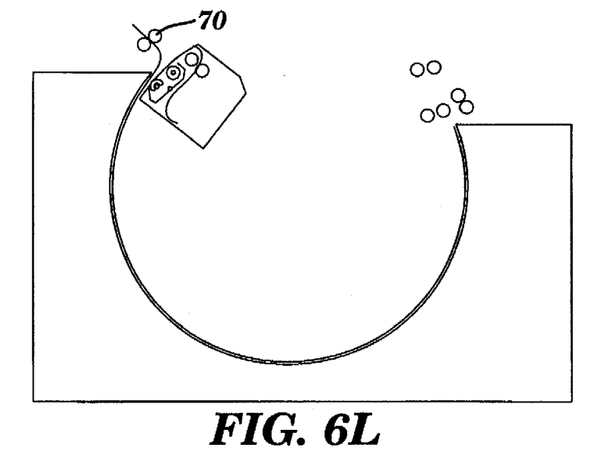

Then the applicator is driven to the output side of the drum, while pulling the proof along behind the applicator as in FIG. 6L. The output guide is reset to accept the leading edge of the receiver from the applicator. The leading edge of the proof is released from the vacuum cushion and fed into the output guide for re-directing the proof against its natural curl and into the output conveyor for scuff-free transport of the unprotected side of the proof having the image. The output conveyor 70 delivers the proof to an external device for further processing of the proof which can include lamination onto a paper support or with a protective transparent layer or coating material.

In an alternative embodiment the sequence in which the vacuum is applied reduces the need for the ironing roller on the pivoting platen. For example, after the receiver sheet has been positioned in the drum and the applicator is holding the end of the receiver sheet, the vacuum on the input side of the drum can be pulled near the idler roller urging the receiver material against the drum in compression. Then the vacuum is pulled at the center of the drum, the vacuum tube is shut off to release the leading end of the sheet and then vacuum is pulled at the output side of the drum. This method relies not only on the vacuum sequence but on the accurate alignment of the applicator relative to the drum and the axis of the material.

During donor application onto the receiver in the embodiment when the ironing roller is eliminated, the leading edge of the donor 350 is advanced into the applicator and guided by the curling platen through the applicator rollers 278 and against the drum overlaying the donor sheet 340 as in PIG. 6F. The vacuum in the drum is already on at the input side, middle, and output side of the drum to hold the receiver sheet in a secured position on the drum during donor overlaying. Then, additional vacuum channels are turned on as the donor is applied through the applicator rollers and as the donor material is metered by the transport rollers to form the catenary between the transport rollers and the applicator as in FIG. 6G. The accurate alignment of the applicator relative to the drum and the axis of the material is relied upon to properly superimpose the donor onto the receiver, without the use of the ironing roller. This method of applying vacuum under the successive portions of the receiver during donor superimposition along the drum continues after the donor material is cut as described for the preferred embodiment.

To assist with pulling the donor material into intimate contact with the receiver material, a partially perforated receiver material can be used. In this case, during application of the donor material onto the receiver material, the vacuum that is applied to hold the receiver to the drum is pulled directly through perforations in the receiver material to draw the overlaying donor material into contact. The donor materials do not have to overlap the edges of the underlying receiver material for the vacuum to be applied to the donor reducing the amount of donor material consumed in the process. The perforation are located in the non-image areas so as not the interfere with the output image. Also the perforation can be covered by imaging the perforated areas to transfer material and fill the perforations after performing the vacuuming function.

While the preferred embodiment is described as a DDCP device, one skilled in the art will appreciate that the present invention is adaptable to serve as an imagesetter, or a combination imagesetter and proofer, and/or as a platesetter, and accordingly is usable with various media such as film, paper, and/or plate materials. The imaging unit is changeable to employ a beam source which operates in a wavelength range capable of exposing a single imaging material or various materials according to a particular sensitivity or threshold value or range of values for the respective materials. The methods and apparatuses described herein apply to conventional "wet" imagesetting films, paper and plates for which donor materials are not used in conjunction with and which are treated as receiver materials as described herein and then chemically processed after imaging, and dry films, papers, and plates in addition to those materials previously described. Transfer processes include laser induced sublimation or fusible thermal transfer, or ablative transfer. Those skilled in the art will appreciate that other various modifications, substitutions, omissions and changes may be made without departing from the spirit of the invention. Accordingly, it is intended that the scope of the present invention be limited solely by the scope of the following claims, including equivalents thereof.

We claim:

1. An electronic prepress system for electronically preparing and outputting images onto image receiving materials, comprising:

computer means for generating and storing color separated images in electronic files;

processing means for processing the electronic files received from said computer means and converting said electronic flies to rasterized image files; and output means for accepting the rasterized image files from said processing means and outputting said color separated images on an image receiving material, wherein said output means has a first operating mode for outputting said color separated images individually onto a first image receiving material as a set having a separate image for each of said color separated images, and a second operating mode for outputting said color separated images onto a second image receiving material having said color separated images superimposed as an assembled color proof of said image.

2. The apparatus according to claim 1, wherein said first image receiving material is photosensitive recording media and said second image receiving material is thermal transfer recording material.

3. The apparatus according to claim 1, wherein said first image receiving material is plate material and said second image receiving material is thermal transfer recording material.

4. The system according to claim 1, wherein said output means includes a cylindrical drum support means for supporting the image receiving material having an inner circumference on which the image receiving material is supported against, and imaging means for exposing said images onto the image receiving material.

5. The apparatus according to claim 4, wherein said imaging means is positioned along a center axis inside the cylindrical drum to scan an energy beam in parallel scan lines in a direction substantially normal to the center axis of the cylindrical drum and wherein said energy beam is modulated according to said processing means.

6. A thermal imaging apparatus for outputting images on image receiving materials, comprising:

output means for outputting images from digital image data onto an imaging material, including support means for supporting the material, imaging means for exposing the material, dispensing means for dispensing the material toward said support means, and loading means for automatically loading and unloading the material onto said support means, wherein said output means has a first operating mode for outputting color separated images individually onto a first image receiving material as a set having a separate image for each of said color separated images, and a second operating mode for outputting color separated images onto a second image receiving material with said color separated images superimposed as a color proof.

7. The apparatus according to claim 6, wherein said output means further includes a material supply carousel having a plurality of imaging materials supported on said carousel for selection by said dispensing means for said first operating mode and said second operating mode.

8. The apparatus according to claim 7, wherein said plurality of image recording materials includes thermal transfer recording material and photosensitive recording material.

* * * * *